United States Patent [19]

Doyle

[11] 4,437,597
[45] Mar. 20, 1984

[54] MOUNTING APPARATUS FOR A DIRT BIKE

[76] Inventor: Richard H. Doyle, 901 S. 6th Ave., Sp 406, Hacienda Heights, Calif. 91745

[21] Appl. No.: 281,024

[22] Filed: Jul. 6, 1981

[51] Int. Cl.³ .............................................. B60R 9/10
[52] U.S. Cl. ........................... 224/42.45 R; 224/42.12; 211/20; 211/23
[58] Field of Search ...................... 224/42.45 R, 42.12, 224/42.30; 211/17, 20, 24, 22, 23; D12/115; 280/293, 299, 302

[56] References Cited

U.S. PATENT DOCUMENTS

| | | | |
|---|---|---|---|
| 585,917 | 7/1897 | Lang | 211/20 |
| 618,507 | 1/1899 | Henderson & Hibbard | 211/19 |
| 3,861,533 | 1/1975 | Radek | 211/20 |

*Primary Examiner*—Steven M. Pollard
*Assistant Examiner*—David Voorhees
*Attorney, Agent, or Firm*—Boniard I. Brown

[57] ABSTRACT

Mounting apparatus for a vehicle with wheels having tires thereon, includes support means including a tire-engaging securing member for preventing vehicle movement in a first direction by engagement with one of the tires, and apparatus for preventing vehicle movement in a second direction opposite from the first direction by engaging said tire, and including a second securing member which has a tire-engaging portion and is pivotable about a first pivot on the support means for movement to and from a tire engaging position, and a third securing member which is pivotally mounted for movement into and from a tire-engaging position. The third securing member is preferably pivotally mounted at a second pivot which is on an end portion of the second securing member opposite from the tire-engaging portion of the second member, thus to cause displacement of the second pivot to urge the engaging portion of the third member into engagement with the tire when the second securing member is pivotally moved into its tire-engaging position.

16 Claims, 4 Drawing Figures

U.S. Patent     Mar. 20, 1984     4,437,597
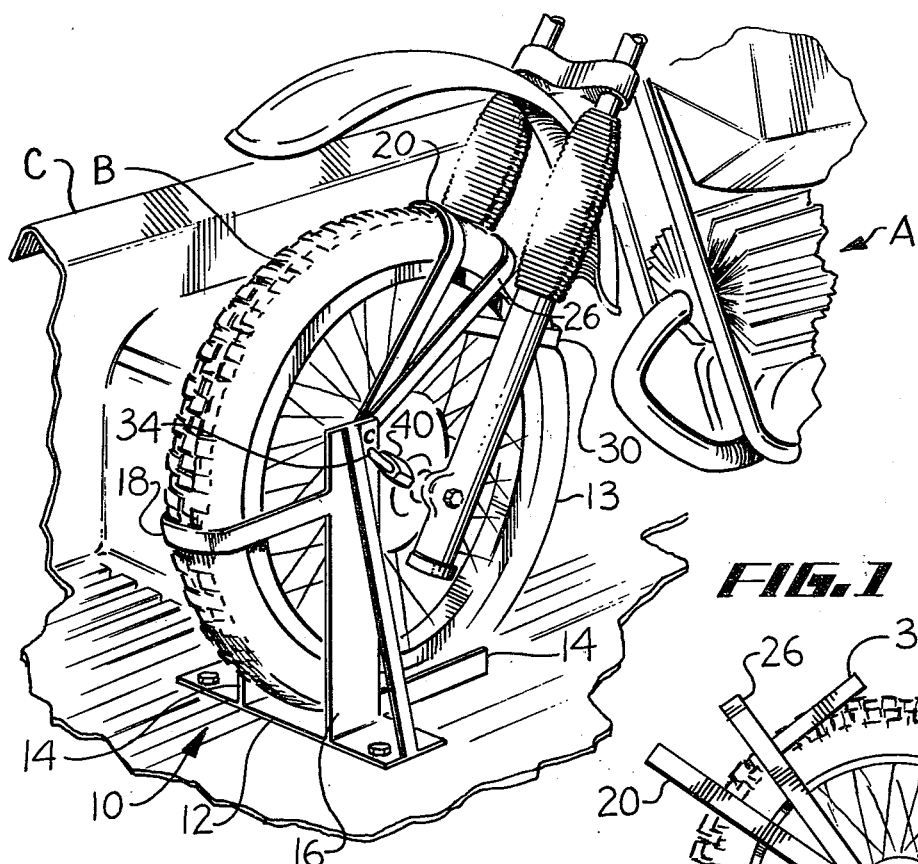
FIG. 1
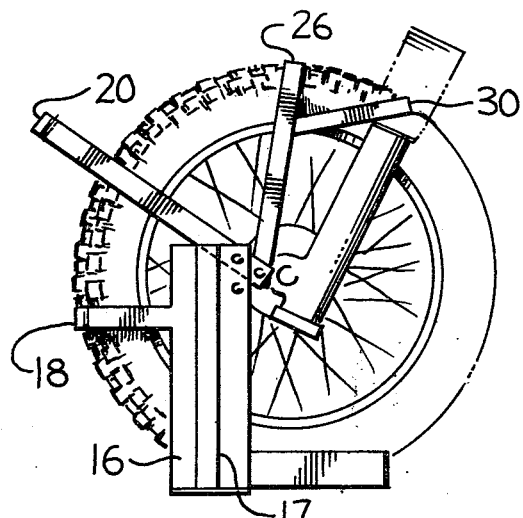
FIG. 2
FIG. 3
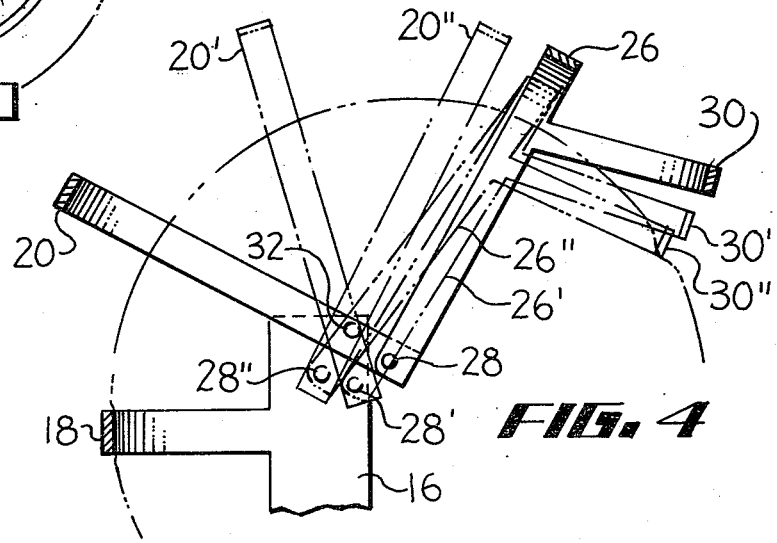
FIG. 4

1

MOUNTING APPARATUS FOR A DIRT BIKE

BACKGROUND OF THE INVENTION

The invention relates to a mounting or hold-down apparatus for use with dirt bikes while they are being transported in a trailer, van, pickup truck or the like. While the invention has particular application to dirt bikes, it will be understood to also have application to motorcycles, motor bikes, motor skooters and the like.

It is a common practice to move such vehicles to new locations where they may be used to ride trails, participate in hill climbs or other activities. It is essential to transport such dirt bikes in a manner which prevents significant lateral as well as longitudinal movement. Commonly such vehicles have been secured with cords, which may be nylon, or ropes. Such means for mounting these vehicles have not been wholly satisfactory because they are subject to sudden unanticipated failure and are relatively difficult to install. In addition such apparatus requires substantial time to install and is subject to damage either from breakage or due to a change in elasticity. In addition the use of cords or ropes is not satisfactory because they do not permit the user to lock the vehicle in place.

It is a primary object of the invention to provide apparatus which will firmly and reliably lock a vehicle in place.

It is an object of the invention to provide apparatus which enables the user to securely lock a vehicle in place in a manner which will make theft of the vehicle difficult.

It is still another object of the invention to provide apparatus which, in addition, is safe, reliable, positive, quick and convenient and does not wear out.

Still another object of the invention is to provide apparatus which can be manufactured at relatively low cost.

SUMMARY OF THE INVENTION

The foregoing objects and other objects and advantages which shall become apparent from the detailed description of the preferred embodiment are attained in an apparatus which includes mounting apparatus for an associated vehicle which has a plurality of wheels having tires thereon. In one form a pivotally mounted U-shaped member engages a tire and means is provided for moving the pivot axis to more positively engage the U-shaped member with the tire.

The apparatus may in another form include support means and a first generally U-shaped securing member for preventing movement of the associated vehicle in a first generally horizontal direction by engagement with one of the tires. The first generally U-shaped member is carried on the support means. Means is provided for preventing movement in a second generally horizontal direction opposite to the first direction by engagement with the one tire which includes at least a second generally U-shaped securing member which is pivotally mounted on the support means. The second generally U-shaped member has first and second legs disposed in spaced generally parallel relationship and has a pivot axis extending substantially in a plane defined by first and second generally parallel legs thereof. The second generally U-shaped member has a mid-section disposed intermediate the first and second legs thereof. The second generally U-shaped member is dimensioned and configured for motion about the pivot axis between positioned first and second positions wherein the mid-section of the second generally U-shaped member is disposed in contacting relationship with an associated tire of the associated vehicle in the first position thereof and disposed away from the associated tire in the second position.

The means for preventing motion in a second direction may further include a third generally U-shaped member and means for pivotally mounting the third generally U-shaped member. The means for pivotally mounting may be carried on the support means. The third generally U-shaped member may have first and second leg portions and the pivot axis thereof extends substantially in a plane defined by the first and second spaced and generally parallel legs thereof and substantially at right angles to the first and second spaced and generally parallel legs thereof.

The means for constraining motion in a second direction may further include means in addition to the first, second and third generally U-shaped members, and the first, second, and third generally U-shaped members may be dimensioned and configured for engagement with the circumferential extent of an associated tire. The points of contact of the second and third members with the circumference of the associated tire are spaced and the generally U-shaped member may further carry additional means for engaging the circumferential extent of the associated tire at a point spaced from the points of contact respectively of the second and third generally U-shaped members.

The apparatus may further comprise a fourth generally U-shaped member which is fixed to the third generally U-shaped member and may have first and second legs disposed in spaced generally parallel relationship. The first and second legs of the fourth generally U-shaped member may be respectively substantially coplanar with the first and second legs of the third generally U-shaped member. The first leg of the third generally U-shaped member may be disposed in substantially coplanar relationship with the first leg of the fourth generally U-shaped member. The second leg of the third generally U-shaped member and the second leg of the fourth generally U-shaped member may be substantially coplanar. The third generally U-shaped member may be dimensioned and mounted to pivot relative to said second generally U-shaped member.

The support means may include upstanding flanges spaced apart sufficiently to allow positioning of the one tire therebetween. One of the second and third generally U-shaped members may include an aperture and the support means may include an aperture. The apertures may be disposed in substantially aligned relationship when the second and third generally U-shaped members are disposed substantially contacting the one associated tire.

BRIEF DESCRIPTION OF THE ACCOMPANYING DRAWING

FIG. 1 is a partial perspective view of a pickup truck bed supporting a dirt bike having the front wheel thereof engaged by the apparatus in accordance with the invention;

FIG. 2 is a simplified partial elevational view illustrating the manner of initial cooperation between the apparatus in accordance with the invention and an associated dirt bike;

FIG. 3 is another simplified partial elevational view showing the fully engaged position of the apparatus in accordance with the invention with the associated dirt bike; and FIG. 4 is a simplified partial elevational view in partial section, illustrating successive positions of portions of the apparatus.

DESCRIPTION OF THE PREFERRED EMBODIMENT

Referring now to FIGS. 1-4, there is shown a dirt bike A having a front wheel B. The wheel B is engaged by the mounting apparatus 10 which is constructed in accordance with one form of the invention. The apparatus 10 includes a base plate 12 having marginally disposed generally parallel, upstanding flanges 14, 14. The base plate 12 is shown fixed to the bed of a pickup truck C. Mounted on the base plate 12 are generally vertical and parallel upstanding support arms 16, 16.

Fabricated, preferably as an integral part of the support arms 16, is a first generally U-shaped securing member 18 which is disposed in a generally horizontal orientation. In other words, the generally U-shaped member 18 is disposed in generally parallel relationship to the base plate 12. The U-shaped member 18 may alternatively be bolted, welded or fastened in some other known manner to the support members 16, 16.

A second generally U-shaped securing pivot member 20 is mounted, for pivotal motion on the support member 16, 16 by bolts 22, 22 (one shown). The second generally U-shaped member 20 serves as handle member which facilitates the engagement with the wheel B of associated dirt bike A. Mounted on the second generally U-shaped member 20 is a third generally U-shaped securing member 26. The third generally U-shaped securing member 26 is mounted for relative pivotal motion with respect to the second generally U-shaped member 20 by pivot bolts 28, 28. A brace 17 extends from the base plate 12 to the top of each support member 16.

Fixed to the third generally U-shaped member 26 as an integral part of the third member is a fourth generally U-shaped securing member 30 which extends to the right side (as viewed) of the third generally U-shaped member 26. The first, second, third, and fourth generally U-shaped members 18, 20, 26, and 30 collectively enclose a generally circular envelope (see FIG. 4) corresponding to the wheel B of the associated dirt bike A. The second generally U-shaped member 20 is provided with an aperture 32 which is aligned with an aperture 34 in the support member 34. The apertures 32, 34 are disposed in aligned relationship in a position of the second U-shaped member 20 best illustrated in FIG. 1. The apertures 32, 34 are dimensioned to accommodate a padlock 40 to prevent theft of the associated dirt bike A.

The geometric relationship of the various elements will be better understood by reference to FIG. 4 wherein three discrete positions of the second generally U-shaped member 20 are shown. This element is identified respectively in the three discrete positions by the numerals 20, 20', and 20". Similarly the third generally U-shaped member 26 is shown in three discrete positions corresponding to the three corresponding positions of the second generally U-shaped member 20. The third generally U-shaped member 26 is indicated by the numerals 26, 26' and 26" in each of these three positions. Similarly the fourth generally U-shaped member 30 is shown in three positions and is identified by the numerals 30, 30' and 30". The geometric relationship between the first, second, third and fourth generally U-shaped members 18, 20, 26 and 30 relative to the envelope indicated by broken-line showing in FIG. 4.

In operation the second and third generally U-shaped members 20 and 26 are rotated to the position illustrated in FIG. 2. The dirt bike A is positioned intermediate the upstanding flanges 14, 14 and against the first generally U-shaped member 18. The third generally U-shaped securing member 26 with the attached fourth generally U-shaped member 30 is rotated to the position illustrated in FIG. 3. Thereafter the second generally U-shaped pivot member 20 is rotated clockwise (as viewed) to approximately the position illustrated in FIG. 1. As will be apparent from the geometric relationships illustrated in FIG. 4, the rotation of the second generally U-shaped member 20 from the position illustrated in FIG. 3 to the position illustrated in FIG. 1, causes the third and fourth generally U-shaped members 26, 30 to more firmly engage the tire B. It will thus be seen that the apparatus provides a very positive locking engagement with the tire B. The apparatus 10 will also be seen to provide a locking action by virtue of the shift of the axis of rotation of the third generally U-shaped member 26 illustrated in FIG. 4. The engagement with the circumference of the tire B at widely spaced peripheral portions thereof will minimize any tendency for the dirt bike A to fall to one side.

The use of a padlock 40 to engage the apertures 32, 34 is particularly advantageous when the apparatus 10 is utilized in an open pickup truck, trailer or the like where the danger of theft is most acute.

The invention also has application to other vehicles such as tractors which have exposed wheels and might be transported on flatbed trailers or the like using mechanisms of the same general type which has been described.

The invention has been described with reference to its illustrated preferred embodiment. Persons skilled in the art may, upon exposure to the teachings herein, conceive variations in the mechanical development of the components therein. For example, the U-shaped members may be replaced by L-shaped members in the same manner as the U-shaped members described herein. The locking apparatus may be provided for more than one wheel and may be used, for example, on several wheels of a four wheel vehicle. Such variations are deemed to be encompassed by the disclosure, the invention being delimited only by the appended claims.

I claim:

1. Mounting apparatus for a vehicle having a plurality of wheels having tires thereon which comprises:
   support means,
   a first generally U-shaped member for preventing movement of the vehicle in a first generally horizontal direction by engagement with one of said tires, said first generally U-shaped member being carried on said support member,
   means for preventing movement in a second generally horizontal direction which is opposite to said first direction by engagement with the one tire,
   said means for preventing movement in a second generally horizontal direction comprising at least a second generally U-shaped member which is pivotally mounted on said support means, said second generally U-shaped member having first and second legs disposed in spaced generally parallel relationship and having a pivot axis extending substantially in a plane defined by said first and second generally parallel legs thereof, said second generally U-shaped member having a mid-section disposed intermediate said first and second legs thereof, said second generally U-shaped member being dimensioned and configured for motion about said pivot axis between first and second positions, said second U-shaped member being disposed with said mid-section thereof disposed in contacting relationship with an associated tire of the associated vehicle in said first position and disposed away from said associated tire in said second position, said means for preventing motion in a second generally horizontal direction further including a third generally U-shaped member, and means for pivotally mounting said third generally U-shaped member.

2. The apparatus as described in claim 1, wherein:
said means for pivotally mounting said third generally U-shaped member is carried on said second generally U-shaped member.

3. The apparatus as described in claim 2, wherein:
said third generally U-shaped member has first and second leg portions and a pivot axis thereof which extends substantially in a plane defined by said first and second spaced and generally parallel legs thereof and substantially at right angles to said first and second spaced and generally parallel legs thereof.

4. The apparatus as described in claim 3, wherein:
said means for preventing motion in said second direction further include means in addition to said first, second and third generally U-shaped members and said first, second, and third generally U-shaped members are dimensioned and configured for engagement with the circumferential extent of an associated tire.

5. The apparatus as described in claim 4, wherein:
the points of contact of said second and third members with the circumference of the associated tire are spaced and the third generally U-shaped member further carries additional means for engaging the circumferential extent of the associated tire at a point spaced from said points of contact respectively of said second and third generally U-shaped members.

6. The apparatus as described in claim 5, wherein:
said apparatus further comprises a fourth generally U-shaped member which is fixed to said third generally U-shaped member and has first and second legs disposed in spaced generally parallel relationship.

7. The apparatus as described in claim 6, wherein:
said first and second legs of said fourth generally U-shaped member are respectively substantially coplanar with said first and second legs of said third generally U-shaped member.

8. The apparatus as described in claim 7, wherein:
said first leg of said third generally U-shaped member is disposed in substantially coplanar relationship with said first leg of said fourth generally U-shaped member.

9. The apparatus as described in claim 8 or 7, wherein:
second leg of said third generally U-shaped member and said second leg of said fourth generally U-shaped member are substantially coplanar.

10. The apparatus as described in claim 9, wherein:
said third generally U-shaped member is dimensioned and mounted to pivot relative to said second generally U-shaped member and said second generally U-shaped member is configured to pivot to more positively engage the third generally U-shaped member with the associated tire.

11. The apparatus as described in claim 10, wherein:
said support means include upstanding flanges spaced apart sufficiently to allow positioning of the one tire therebetween.

12. The apparatus as described in claim 11, wherein:
one of said second and third generally U-shaped members includes an aperture and said support means include an aperture, said apertures being disposed in substantially aligned relationship when said second and third generally U-shaped members are disposed in substantial contact with said one associated tire.

13. Mounting apparatus for a vehicle having a plurality of wheels having tires thereon, which comprises:
support means including a tire-engaging first securing member to prevent movement of the vehicle in a first generally horizontal direction by engagement with one of said tires, a second securing member having a tire-engaging portion and being pivotally mounted at a first pivot on said support means for movement between a tire-engaging position and a position spaced from the tire, and a third securing member pivotally mounted at a second pivot spaced from said first pivot and on an end portion of said second securing member opposite from said tire-engaging portion of the second member to cause displacement of said second pivot to urge said tire-engaging portion of the third member into engagement with said one tire upon pivotal movement of the second securing member to a position wherein its tire-engaging portion contacts said one tire.

14. The apparatus as described in claim 13, and further including:
an additional member extending from the third securing member in a direction away from the second securing member and adapted to engage the tire.

15. The apparatus as described in claim 13, wherein:
said support means has upstanding spaced flanges for positioning of said tire therebetween.

16. The apparatus as described in claim 13, wherein:
one of said securing members has an aperture and the support means has an aperture, said apertures being in substantial registration when the securing member is in substantial contact with the tire to accommodate extension of a lock member through the apertures.

* * * * *